United States Patent
Frei

(10) Patent No.: US 8,406,139 B2
(45) Date of Patent: *Mar. 26, 2013

(54) METHOD AND APPARATUS FOR EFFICIENT TRANSFER OF DATA OVER A NETWORK

(75) Inventor: Randall Wayne Frei, San Jose, CA (US)

(73) Assignee: Trilliant Networks, Inc., Redwood City, CA (US)

( * ) Notice: Subject to any disclaimer, the term of this patent is extended or adjusted under 35 U.S.C. 154(b) by 282 days.

This patent is subject to a terminal disclaimer.

(21) Appl. No.: 12/917,605

(22) Filed: Nov. 2, 2010

(65) Prior Publication Data

US 2011/0058494 A1    Mar. 10, 2011

Related U.S. Application Data

(63) Continuation of application No. 11/311,452, filed on Dec. 19, 2005, now Pat. No. 7,826,374.

(51) Int. Cl.
*G01R 31/08* (2006.01)
(52) U.S. Cl. ........................................................ 370/238
(58) Field of Classification Search .................. None
See application file for complete search history.

(56) References Cited

U.S. PATENT DOCUMENTS

| | | | | |
|---|---|---|---|---|
| 4,346,470 A | * | 8/1982 | Alvarez et al. | 370/324 |
| 4,852,090 A | * | 7/1989 | Borth | 370/347 |
| 5,450,394 A | * | 9/1995 | Gruber et al. | 370/253 |
| 5,570,355 A | * | 10/1996 | Dail et al. | 370/352 |
| 6,647,026 B1 | * | 11/2003 | Tanaka | 370/509 |
| 2004/0005902 A1 | | 1/2004 | Belcea | |
| 2005/0058081 A1 | * | 3/2005 | Elliott | 370/252 |
| 2005/0170843 A1 | | 8/2005 | Billhartz et al. | |

FOREIGN PATENT DOCUMENTS

EP    1 601 124 A1    11/2005

OTHER PUBLICATIONS

European Search Report dated Apr. 18, 2011 for Appliation No. 1019565.3-2416.
International Search Report and Written Opinion mailed Mar. 28, 2007 for PCT Application No. PCT/US2006/046817.

* cited by examiner

*Primary Examiner* — Xavier Szewai Wing
*Assistant Examiner* — Leon Andrews
(74) *Attorney, Agent, or Firm* — Moser Taboada

(57) ABSTRACT

A method and apparatus for improving the efficiency of a network. A source node determines the propagation delay for data to reach a destination node. This enables the source node to transmit data more efficiently by ensuring a greater portion of a specific time slot is used for receiving data by the destination node. The destination node then determines if it is connected to any other nodes, and determines the propagation delay between the other connected nodes. The process continues until a node detects it is not connected to any other nodes for which a propagation delay has not been computed. Thus, each node on the network knows the propagation delay between each node, and the nodes utilize this information to more efficiently transfer data through the network.

17 Claims, 4 Drawing Sheets

METHOD AND APPARATUS FOR EFFICIENT TRANSFER OF DATA OVER A NETWORK

BACKGROUND OF THE INVENTION

1. Field of the Invention

This application is a continuation of U.S. patent application entitled "METHOD AND APPARATUS FOR EFFICIENT TRANSFER OF DATA OVER A NETWORK", having Ser. No. 11/311,452, and filed Dec. 19, 2005, which is incorporated by reference herein.

Embodiments of the present invention generally relate to a network and, more specifically, to the efficient transfer of data through a network, as well as techniques for monitoring and management of a network.

2. Description of the Related Art

A conventional network is comprised of nodes and a router, typically arranged in a hub and spoke formation. A node communicates to another node by transmitting data to the router, and the router then couples the data to the destination node. The nodes are unaware of the presence of all the other nodes present on the network, but the router is aware of the presence of all the nodes on the network. The router stores the physical address of all the nodes on the network and facilitates the transmission of data from one node to another.

An ad-hoc network differs from a conventional network because there is no central switching point, i.e., a router, to distribute the data within the network. The nodes are aware of the presence of other nodes on the network, and data is transmitted across the network by passing the data through interconnected nodes.

One example of an ad-hoc network is a mesh network. A node on a mesh network receives and transmits data only during specific time slots. For example, a source node transmitting data to a destination node transmits data during a specific time slot designated for listening for data at the destination node. The time slot is designed with a length comprising a data portion and a portion allocated for propagation delay. Thus, the propagation delay and the distance between the source and destination node causes a portion of the time slot to be unutilized and the transmission of data is not as efficient as possible.

In a network where the distance between source and destination is unknown, the time slot must accommodate the worst case propagation delay. To avoid such transmission inefficiency, the propagation delay may be measured by using time synchronized nodes and sending time of transmission information between nodes. Thus, any node can compute the propagation delay by subtracting the current time from the time of transmission. The time slot length can then be customized to conform to the computed delay such that an entire time slot can be used for data transmission. However, to facilitate such a computation, the network is synchronized to a time base such as the Global Positioning System (GPS) or some other universal time base. Such synchronization adds cost to developing and deploying a network.

Therefore, there is a need in the art for an improved method and apparatus for efficiently transferring data through a time division multiple access network.

SUMMARY OF THE INVENTION

The present invention is a method and apparatus for improving the efficiency of a network and/or providing network monitoring and management capability. In one embodiment of the invention, a source node determines the propagation delay for data to reach a destination node. This enables the source node to transmit data more efficiently by ensuring a greater portion of a specific time slot is used for receiving data by the destination node. The destination node then determines if it is connected to any other nodes, and determines the propagation delay between the other connected nodes. The process continues until a node detects it is not connected to any other nodes for which a propagation delay has not been computed. Thus, each node on the network knows the propagation delay between each node, and the nodes utilize this information to more efficiently transfer data through the network and/or to monitor and manage the network.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
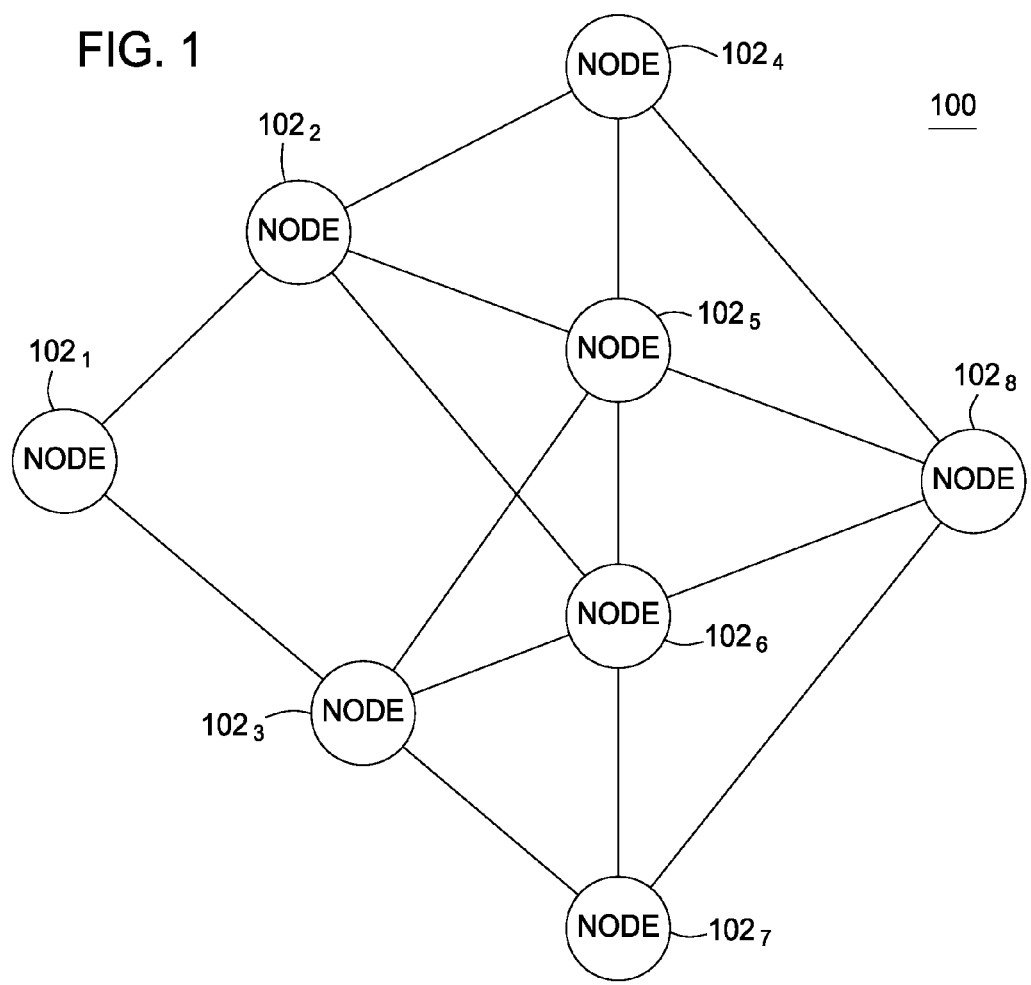
FIG. 1 is a graphical view of a network.

FIG. 1 is a graphical depiction of one embodiment of a network 100 comprising connected nodes 102. The nodes 102 are interconnected to each other such that multiple paths (represented by lines between nodes) exist between each node 102. An exemplary network that may utilize and benefit from the present invention is a mesh network disclosed in commonly assigned U.S. patent application Ser. No. 10/122,883, filed Apr. 15, 2002 and commonly assigned U.S. patent application Ser. No. 10/122,886, filed Apr. 15, 2002, both of which are incorporated herein by reference. Those skilled in the art will realize from the following disclosure that other network topologies, both wired and wireless, may find benefit by using the present invention.

The present invention is a method and apparatus for improving the efficiency of a network 100. In one embodiment of the invention, a source node $102_x$ (where x is an integer), for example, node $102_1$ determines the propagation delay for data to reach a destination node $102_y$ (where y is an integer), for example, node $102_2$. This enables the source node $102_1$ to transmit data more efficiently by ensuring a greater portion of a specific time slot is used for transmitting data to the destination node $102_2$. The destination node $102_2$ then determines if it is connected to any other nodes $102_4$, $102_5$, $102_6$, and determines the propagation delay between the other connected nodes. The process continues until a node $102_{x,y}$ detects it is not connected to any other nodes $102_{x,y}$ for which a propagation delay has not been computed. Thus, each node $102_{x,y}$ on the network knows the propagation delay between itself and each neighboring node, and the nodes utilize this information to more efficiently transfer data through the network.

Figure 2:
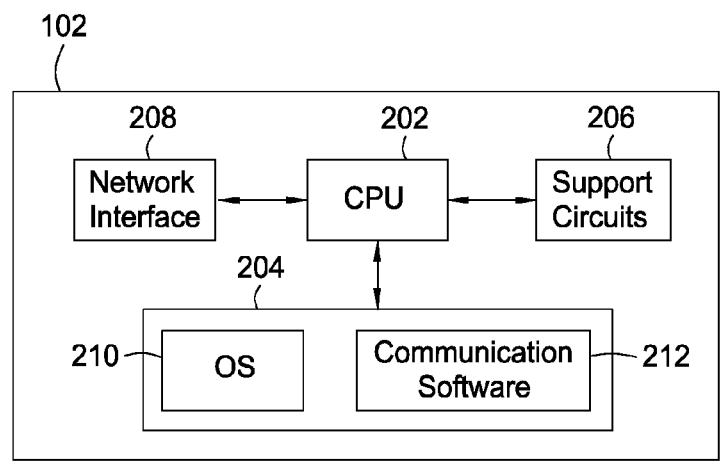
FIG. 2 is a block diagram of a node of a network.

FIG. 2 is a block diagram of a node 102. The node 102 may be a one or more individual computers, wireless devices, personal digital assistants, desktop computers, laptop computers, servers or any other digital device that may benefit from connection to a computer or communications network. In one specific embodiment, one of the nodes, for example, node $102_1$, is a gateway that connects the network 100 to a broadband backbone. As such, the gateway becomes the portal for network data traffic to locations outside of the immediate network 100.

The node 102 comprises a CPU 202, support circuits 206, memory 204 and a network interface 208. The CPU 202 may comprise one or more readily available microprocessors or microcontrollers. The support circuits 206 are well known circuits that are used to support the operation of the CPU and may comprise one or more of cache, power supplies, input/output circuits, network interface cards, clock circuits, and the like. Memory 204 may comprise random access memory, read only memory, removable disk memory, flash memory, optical memory or various combinations of these types of memory. The memory 204 is sometimes referred to as main memory and may, in part, be used as cache memory or buffer memory. The memory 204 stores various forms of software and files, such as, an operating system (OS) 210 and communication software 212. The communications software 212 is executed by the CPU 202 to facilitate operation of the invention as described below. The operating system 210 may be own of a number of well-known operating systems such as LINUX, WINDOWS, WINDOWS CE, SMARTPHONE, PALM, and the like.

The network interface 208 connects the node 102 to the network 100. The network interface 208 may facilitate a wired or wireless connection to other nodes. If the node 102 is a gateway, then the network interface 208 couples to a wired broadband backbone. In addition, the interface 208 couples through narrower bandwidth channels to other nodes of the network via wired and/or wireless connections.

In one embodiment of the invention, the communication software 212 is used to increase the efficiency of a network that employs a time division multiple access architecture (TDMA). The invention finds particular use in asynchronous networks where the nodes of the network do not rely on a common synchronous time base, e.g., GPS. Within an asynchronous, TDMA network, a source node, for example, node $102_1$, transmits data during an allocated timeslot to a destination node, for example, node $102_2$. The destination node $102_2$ receives or listens for data during an allocated time slot. Thus, the efficiency of the network 100 can be increased by the source node $102_1$ increasing the probability transmitted data is received at the beginning of a timeslot when the destination node $102_2$ is set to receive data, i.e., the transmit and receive slots should be synchronized to maximize data throughput.

The probability that a source node $102_1$ will transmit data in a manner that a destination node $102_2$ will receive the data at the beginning of a timeslot is affected by the propagation delay. As is well-known, propagation delay is the time lag between the departure of transmitted data from a source node $102_1$ and the arrival of the transmitted data at a destination node $102_2$.

In one embodiment of the invention, the communication software 212 executed by each of the nodes measures the propagation delay between the source node $102_1$ and a destination node $102_2$ by performing a three-way handshake. Once determined, the source node $102_1$ then transmits the propagation delay to the destination node $102_2$. The destination node $102_2$ uses the delay to delay the timeslot in which the destination node $102_2$ will listen for a transmission from the source node $102_1$. Stated in another way, the delay is the amount of time prior to a destination node listening for data on an allocated timeslot that a source node should transmit data to ensure the data is received at the beginning of a timeslot allocated for receiving at the destination node.

Once the source node $102_1$ and the destination node $102_2$ are aware of the propagation delay between each other, each node can time the transmission of data in such a manner that the receiving node receives the data at the beginning of a timeslot allocated for receiving data. In this manner, synchronization between the two nodes is achieved without a common time base.

The destination node $102_2$ then acts as a source node $102_2$ vis-à-vis the neighboring nodes $102_4$, $102_5$, $102_6$ on the network 100. Communication software 212 of the nodes determines the propagation delay between the destination node $102_2$ and the connected nodes $102_4$, $102_5$, $102_6$. The process is used recursively throughout the network 100 in a manner that each node 102 is aware of the propagation delay between itself and any other connected node 102.

Consequently, timing information is propagated outwards through the network 100 so that all nodes 102 are synchronized with their neighbor nodes without using a common time base.

Figure 3:
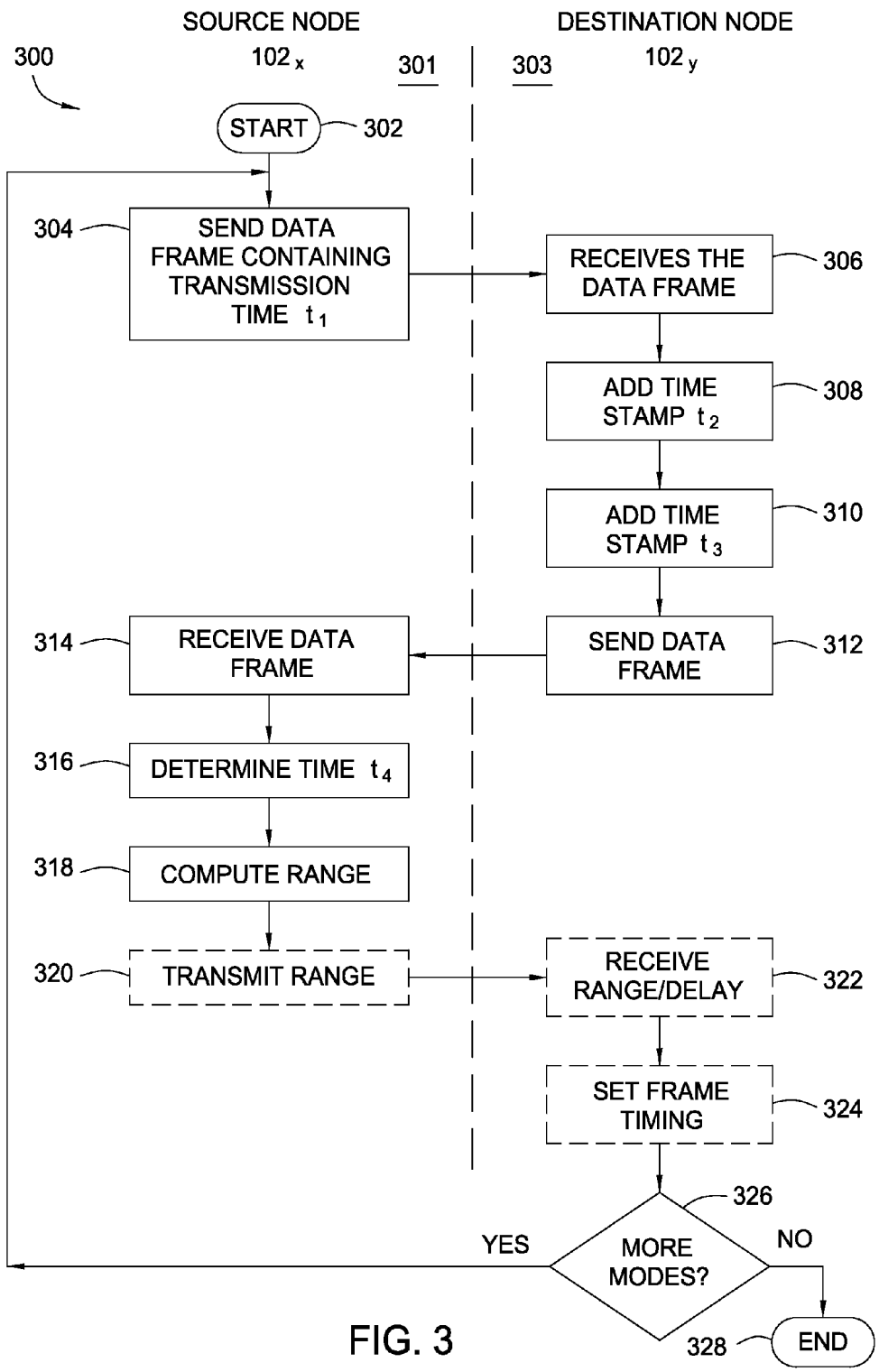
FIG. 3 is a flowchart detailing a method of implementing the present invention.
Figure 4:
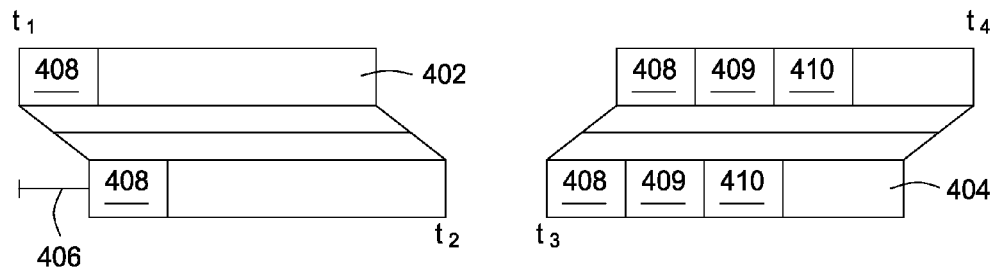
FIG. 4 is a graphical depiction of ranging using the present invention.

FIG. 3 depicts a flow chart of a method 300 of operation of the communication software 212 and FIG. 4 depicts a graphical view of the transmission and reception of a data frames between two nodes $102_x$ and $102_y$. To best understand the operation of the invention, the reader should simultaneously view FIGS. 3 and 4.

The method 300 of FIG. 3 is divided into the method steps 301 performed by the source node $102_x$ and the method steps 303 performed by the destination node $102_y$. The method 300 begins at step 302 and proceeds to step 304 wherein a source node $102_x$ transmits a synchronization message 408 within a data frame 402. The message 408 contains a time of transmission $t_1$. The transmission is addressed to destination node $102_y$. The unknown propagation delay for transmission of the data frame 402 from node 102, to node $102_y$ is represented by reference number 406.

At step 306, the destination node receives the frame 402. At step 308, the destination node $102_y$ stamps the message with its own timestamp 409 provided by the network interface 208. The timestamp 409 indicates the local time, $t_2$, at which point the destination node $102_y$ received the complete frame of data.

In one embodiment, the hardware used in the nodes is IEEE 802.11x compliant, where x is a, b, c, d, e, f, or g. In such compliant hardware, the time synchronization function (TSF) may be used to create the timestamps based on the local time at the node. The conventional usage of TSF is to synchronize the clock of the destination node $102_y$ with the clock of the source node $102_x$. The invention does not require clock synchronization between the source node $102_x$ and the destination node $102_y$ to function. However, the invention will still function if the TSF is used to synchronize the clock of the destination node $102_y$ with the clock of the source node $102_x$. The operation of TSF is well-known by those skilled in the art.

Messages comprising timestamp information can also be used to calibrate the clock of the destination node $102_y$ with the clock of the source node $102_x$. Calibration is performed by a source node $102_x$ sending a plurality of messages comprising timestamp information to a destination node $102_y$; the destination node $102_y$ stamps the message with a local timestamp indicating time of receipt, and then calculates the difference between the time the source node $102_x$ transmitted the message and the time of receipt. The method is repeated for each message within the plurality of messages sent by the source node $102_x$. The destination node $102_y$ averages the differences and uses the average to calibrate its clock.

At step 310, the destination node $102_y$ stamps the message with timestamp 410 containing the transmission time, $t_3$. Then, at step 312, the destination node transmits a data frame 404 to the source node $102_x$. The data frame 404 comprises the timestamps 408, 409, and 410 that provide the time of transmission of the data frame ($t_1$), the time reception was complete ($t_2$) and the time of return transmission of the data frame ($t_3$).

At step 314, the source node $102_x$ receives the data frame 404 and, at step 316, the node $102_x$ determines the local time of complete reception of the data frame, time $t_4$. At step 318, the source node $102_x$ computes the range between the source node $102_x$ and the destination node $102_y$ based upon the timestamp information within the message and the time $t_4$. The source node knows the time of transmission ($t_1$), the time of reception ($t_2$ minus the length of the data frame), the time of transmission from the destination node ($t_3$) and the time of reception at the source node ($t_4$ minus the length of the data frame). These times are processed to derive the propagation delay as follows:

Propagation delay=$(t_4-t_1-(t_3-t_2))/2$

Calculation of the propagation delay can be continually repeated, and an average of the calculated propagation delays taken over time to increase the resolution of the clock. For example, if the clock resolution used is one microsecond, then the accuracy of one calculation is approximately one microsecond, or one-fifth of a mile. By subtly randomizing the time that the messages are sent, messages are decorrelated with the microsecond clock, and the ranging results will most likely fall between two values, with the respective distribution between the values representing the true value. For example, if the calculation yields results of 8,8,8,7,8,8,7,8,8,8 microseconds, then the true value is approximately 7.2 microseconds. This allows a more accurate result to be obtained beyond the clock resolution.

The implemented algorithm also takes into consideration the amount of time it takes to send the frame (x bytes at y mbps), since in one embodiment of the invention, the transmitted and received timestamps correspond to the start-of-frame and end-of-frame.

The following steps are optional, i.e., these steps are not necessary for the invention to function, but may provide additional benefits. At step 320, the source node $102_x$ transmits the range and/or the propagation delay to the destination node $102_y$. At step 322, the destination node $102_y$ receives the range (or delay). At step 324, the destination node 324 sets the frame timing for reception of data from the source node $102_x$ such that data frames are efficiently utilized.

At step 326, the destination node 102 tests to see if it is connected to any other nodes on the network 100 exclusive of the source node $102_x$. If the query is affirmatively answered, then the method proceeds to step 304 where the destination node becomes a source node vis-à-vis the other neighboring nodes. If the query is negatively answered, the method ends at step 320.

Figure 5:
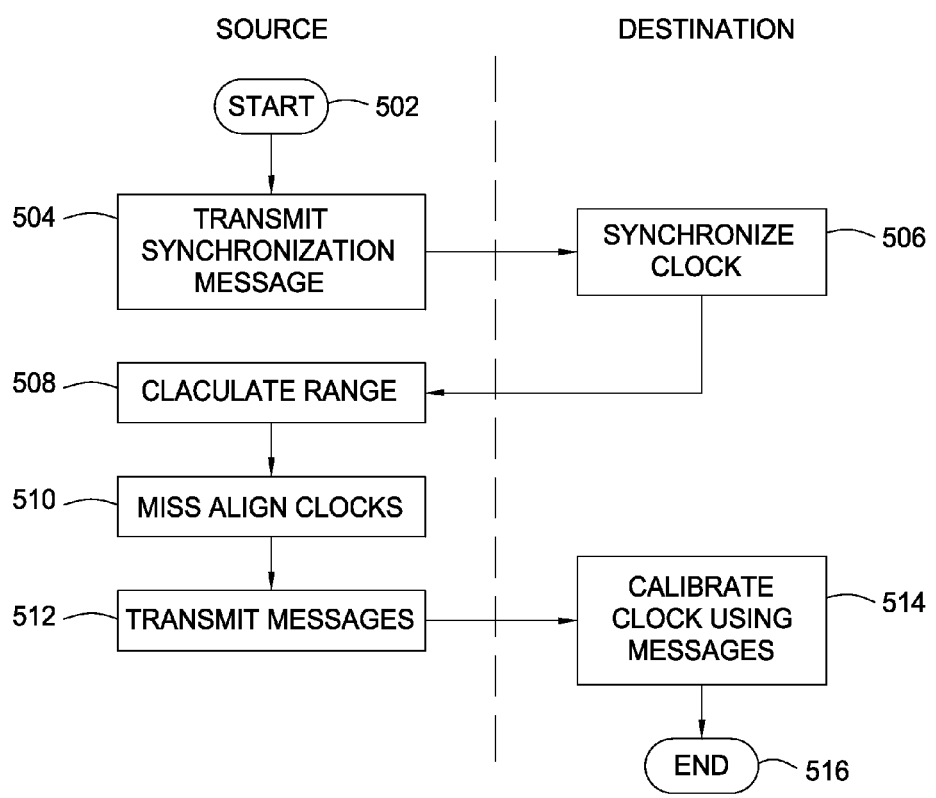
FIG. 5 is a flowchart detailing a method of calibrating a clock that can be implemented within the present invention.

FIG. 5 depicts a flowchart detailing a method of synchronizing and calibrating a clock in a destination node with a clock in a source node. The method utilizes the standard 802.11 time synchronization function.

The method 500, starts at step 502 and proceeds to step 504. At step 504, a source node sends a time synchronization function message to a destination node. At step 506, the destination node synchronizes its clock to the source node in accordance with the standard 802.11 time synchronization function. At step 508, the range between the source node and the destination node is calculated. At step 510, the clocks of the source node and the destination node are misaligned by an amount equal to the propagation delay between the two nodes, allowing frames transmitted from the source node to the destination node to be received at a proper time.

The method 500, also provides a method for calibrating the clocks between a source node and a destination node. At step 512, the source node transmits a plurality of one-way messages to the destination node to calibrate the clock at the destination node. At step 514, the clock speed difference between the source node and the destination node is computed at the destination node. Ideally, because the clock of the source node has been synchronized with the clock of the destination node and offset by the propagation time between nodes, the received timestamp at the destination node should match the transmitted timestamp from the source node. The clock drift between the source node and the destination node can be minimized by computing the clock speed difference between the nodes and using the difference to calibrate the clock of the destination node. The step of calibrating occurs in-between the synchronization of the destination node with the source node. The method ends at step 516.

Figure 6:
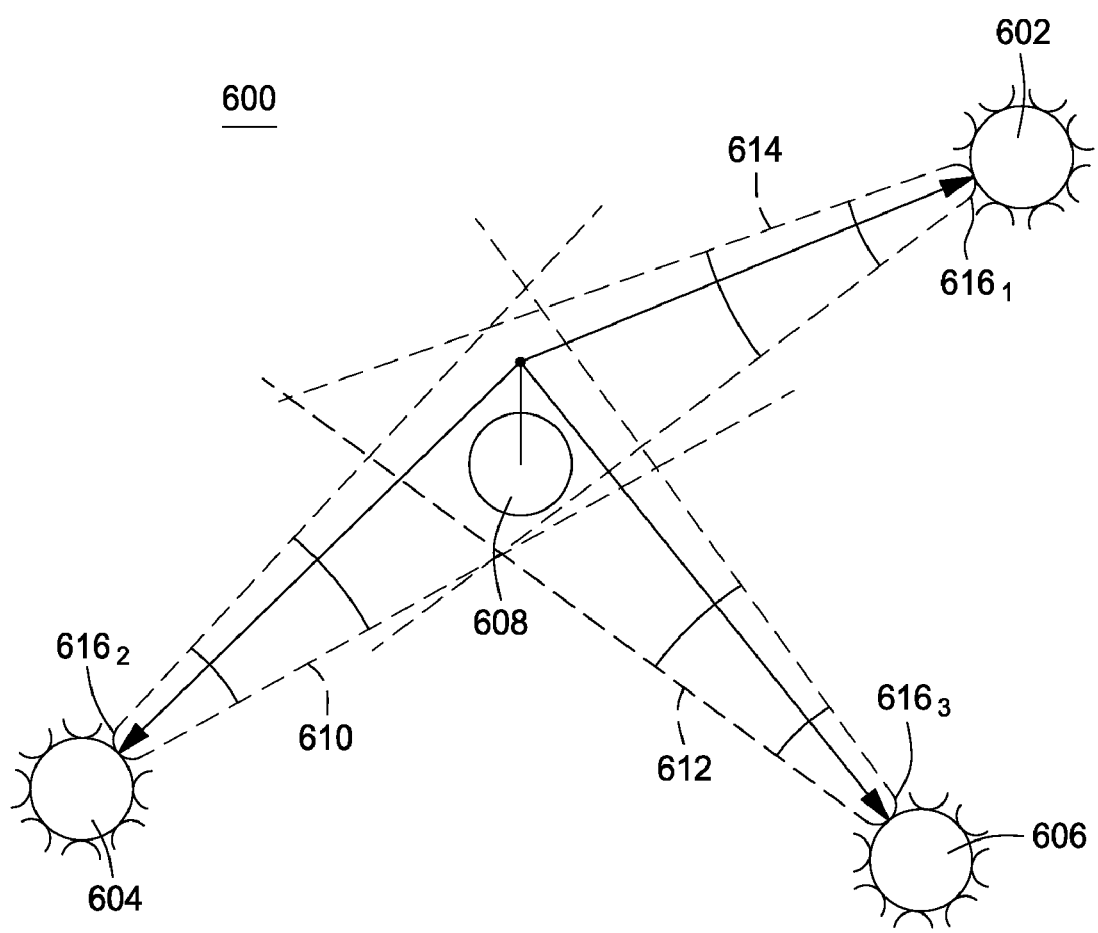
FIG. 6 is a graphical depiction of triangulation between three nodes to determine the location of a fourth node.

FIG. 6 depicts an arrangement of nodes that can be used to determine a location of a node 608 by using directional antennas $616_1$ to $616_3$ (collectively 616) located respectively on nodes 602, 604, and 608. The antenna 616 comprises a plurality of radiators that form individual main beams having a substantially conical radiation pattern that radially extends from each antenna. The directional antennas 616 are designed to receive and transmit signals within a cone-shaped area 610, 612, and 614 such that the node 608 broadcasts a signal to each node 602, 604 and 606 and a signal is received by the directional antennas 616 located on each node. Consequently, if the antenna 616 has six elements, each element forms a radiation pattern that is approximately 30 degrees wide.

An approximate location of the node 608 can be determined using only a first node 602 and a first directional antenna $616_1$. The distance between the node 608 and the first node 602 is calculated using a ranging technique as discussed above. The node 608 communicates with node 602 via one antenna element (e.g., via cone 614). Thus, it is known that the node 608 must be located within the cone at the computed range. A more accurate location of the node 608 can be determined by narrowing the focus of the directional antenna $616_1$ depicted by the cone 614, e.g., adding more elements that have a narrower beamwidth.

A second node 604 can be used to establish an even more accurate location of the node 608. The second node 604 also has a directional antenna $616_2$. The range between the second node 604 and node 608 is calculated. The node 608 is located within an area depicted by cone 610 that radiates outward from the directional antenna $616_2$ and intersects with the area depicted by cone 614. An approximate location can be determined by finding locations within the intersection of cones 610 and 614 that are within the calculated range from the first node 602 and the second node 604.

A unique location of the node 608 can be determined by using a third node 606. The third node 606 has a directional antenna $616_3$. The node 608 is located within an area depicted by cone 612 that radiates outward from the directional antenna $616_3$ and intersects with the areas depicted by cones 610 and 614. A unique location of node 608 can be determined using a triangulation technique by finding the location within the intersection of cones 610, 612, and 614 that is within the calculated range of nodes 602, 604, and 606.

In an alternative embodiment of the invention, the antennas $616_1$ to $616_3$ may be omni-directional antennas such that the ranging information generated using the above-described method of node range determination can be used in a conventional triangulation computation to determine node locations.

While the foregoing is directed to embodiments of the present invention, other and further embodiments of the invention may be devised without departing from the basic scope thereof, and the scope thereof is determined by the claims that follow.

The invention claimed is:

1. A computer-implemented method for calibrating a clock of a node comprising:
   synchronizing a destination node with a source node using a standard 802.11 time synchronization function;
   transmitting a message from the source node to the destination node wherein the message comprises a first timestamp representing a local time of transmission ($t_1$);
   receiving the message at the destination node and stamping the message with a second timestamp that is indicative of a local time of reception ($t_2$);
   calculating a difference between the first timestamp and the second timestamp; and
   calibrating a clock of the destination node by compensating for clock drift between the source node and the destination node using the calculated difference.

2. The method of claim 1 further comprising:
   repeating the method at least once;
   averaging the calculated differences; and
   calibrating the clock of the destination node by compensating for the clock drift between the source node and the destination node using the average of the calculated differences.

3. The method of claim 1 further comprising:
   sending a reply message to the source node from the destination node wherein the reply message comprises the first timestamp, the second timestamp and a third timestamp, where the third timestamp represents a local time of transmission for the reply message ($t_3$);
   receiving the reply message at the source node;
   determining a local time of reception for the reply node at the source node ($t_4$);
   computing a range between the source node and the destination node using the times $t_1$, $t_2$, $t_3$, and $t_4$;
   using a directional antenna to determine an approximate area within which the destination node is located; and
   determining an approximate location of the destination node within the approximate area located at the range from the source node.

4. The method of claim 3 wherein the directional antenna comprises a plurality of radiation elements that each form a radiation pattern and wherein the approximate area is within one of the radiation patterns.

5. The method of claim 3 further comprising:
   computing a plurality of ranges to a plurality of nodes using a plurality of directional antennas to improve the accuracy of the approximate location.

6. The method of claim 5, wherein the directional antenna is omni-directional and the method further comprises:
   computing a location of nodes using a plurality of omni-directional antennas and a triangulation computation.

7. An apparatus for calibrating a clock of a node comprising:
   a source node for transmitting a message to a destination node wherein the message comprises a first timestamp representing a local time of transmission ($t_1$);
   a destination node for receiving the message and stamping the message with a second timestamp that is indicative of a local time of reception ($t_2$);
   a processor within the destination node for calculating a first difference between the first timestamp and the second timestamp;
   the source node transmitting at least a second message to the destination node wherein the at least a second message comprises a first timestamp representing a local time of transmission ($t_1$);
   the destination node for receiving the at least a second message and stamping the at least a second message with a second timestamp that is indicative of a local time of reception ($t_2$);
   a processor within the destination node for calculating at least a second difference between the first timestamp and the second timestamp;
   the processor calculating an average between the first difference and the at least a second difference; and
   the processor calibrating the clock of the destination node using the average.

8. The apparatus of claim 7 further comprising:
   the destination node for sending a reply message to the source node wherein the reply message comprises the first timestamp, the second timestamp and a third timestamp, where the third timestamp represents a local time of transmission for the reply message ($t_3$);
   a directional antenna, coupled to the source node, for creating a plurality of radiation patterns, where each radiation pattern extends from the antenna in a unique direction; and
   a processor within the source node for determining a local time of reception for the reply node at the source node ($t_4$), computing a range between the source node and the destination node using the times $t_1$, $t_2$, $t_3$, and $t_4$ and determining a radiation pattern used to receive the message from the destination node, where the determined radiation pattern defines a direction.

9. The apparatus of claim 8 wherein the directional antenna has an omni-directional radiation pattern.

10. The apparatus of claim 8 further comprising:
    the processor for computing a range between the source node and the destination node using the times $t_1$, $t_2$, $t_3$, and $t_4$, using the directional antenna to determine an approximate area within which the destination node is located and determining an approximate location of the destination node within an approximate area located at the range from the source node.

11. The apparatus of claim 10 wherein the approximate area within which the destination node is located is within the determined radiation pattern.

12. The apparatus of claim 7, wherein the source node and the destination form at least a portion of a mesh network.

13. A computer-implemented method for determining the location of a node comprising:
    transmitting a message from a source node to a destination node wherein the message comprises a first timestamp representing a local time of transmission (t1);
    receiving the message at the destination node and stamping the message with a second timestamp that is indicative of a local time of reception (t2);

sending a reply message to the source node from the destination node wherein the reply message comprises the first timestamp, the second timestamp and a third timestamp, where the third timestamp represents a local time of transmission for the reply message (t3);

receiving the reply message at the source node;

determining a local time of reception for the reply node at the source node (t4;

computing a range between the source node and the destination node using the times t1, t2, t3, and t4;

using a directional antenna to determine an approximate area within which the destination node is located; and determining an approximate location of the destination node within the approximate area located at the range from the source node.

14. The method of claim 13 wherein the directional antenna comprises a plurality of radiation elements that each form a radiation pattern and wherein the approximate area is within one of the radiation patterns.

15. The method of claim 13 further comprising:

computing a plurality of ranges to a plurality of nodes using a plurality of directional antennas to improve the accuracy of the approximate location.

16. The method of claim 13 further comprising:

synchronizing the destination node with the source node using a standard 802.11 time synchronization function;

calculating a difference between the first timestamp and the second timestamp; and calibrating a clock of the destination node by compensating for clock drift between the source node and the destination node using the calculated difference.

17. The method of claim 16 further comprising:

repeating the method at least once;

averaging the calculated differences; and calibrating the clock of the destination node by compensating for the clock drift between the source node and the destination node using the average of the calculated differences.

* * * * *